July 24, 1956 W. A. RINGLER 2,755,983
TUBULAR CONTAINERS
Filed March 16, 1953 6 Sheets-Sheet 1
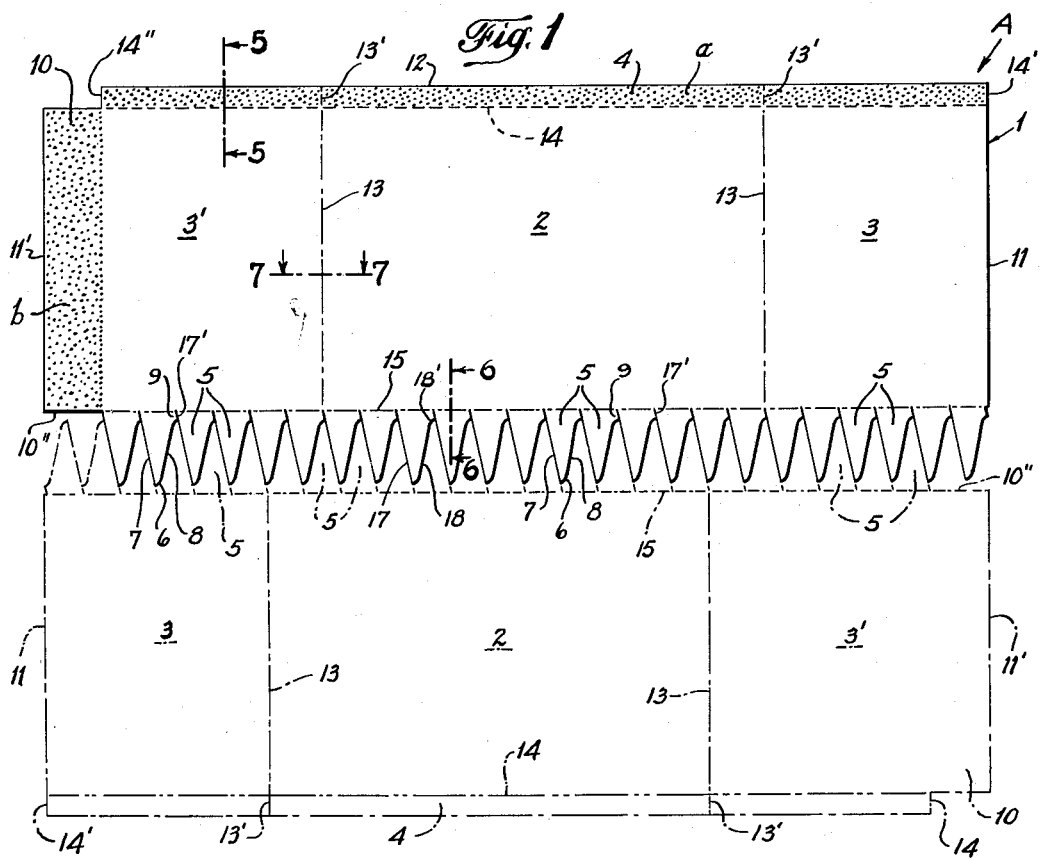
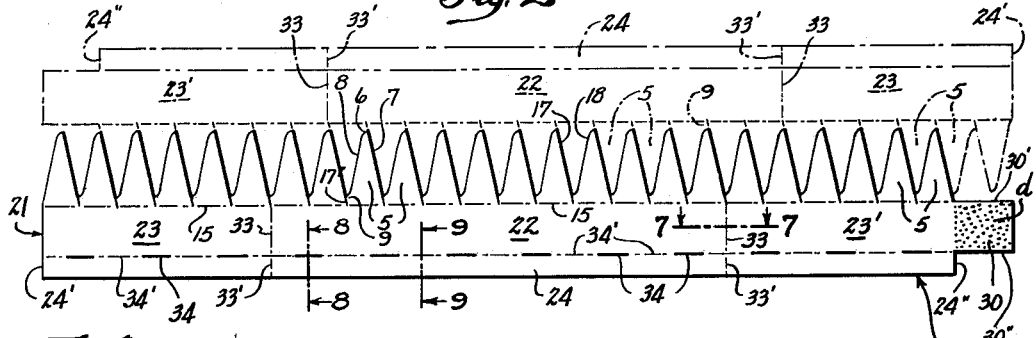
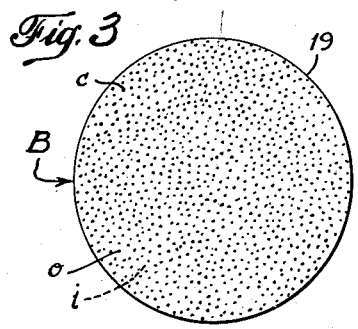
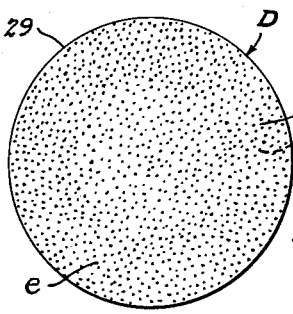
INVENTOR.
WILLIAM A. RINGLER
BY
ATTORNEY.

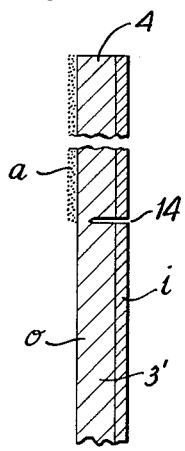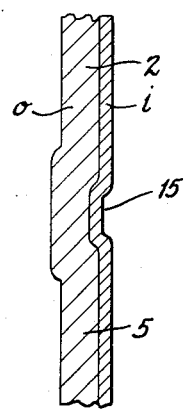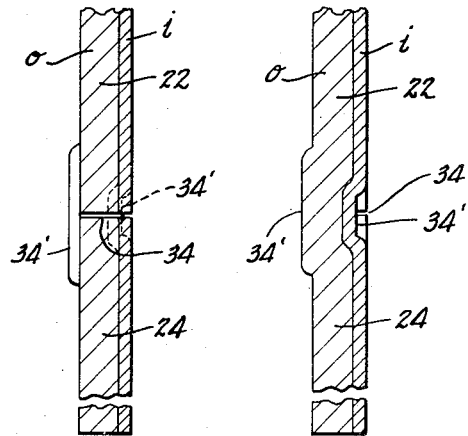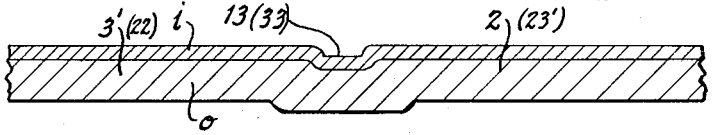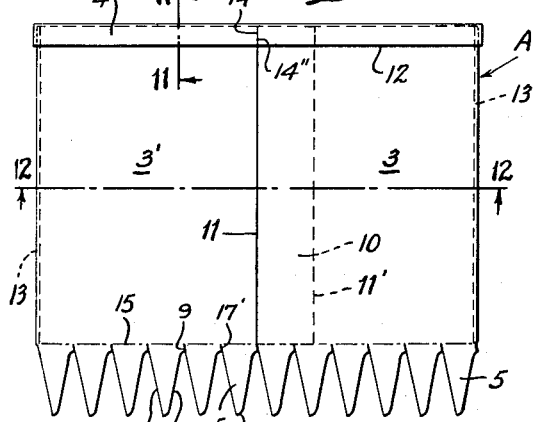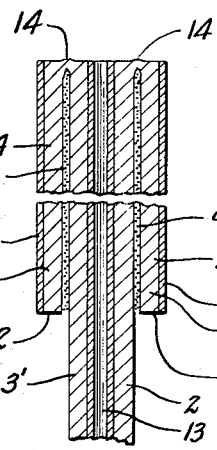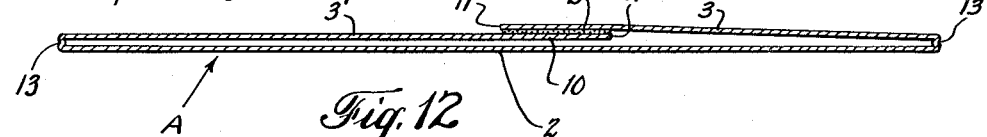

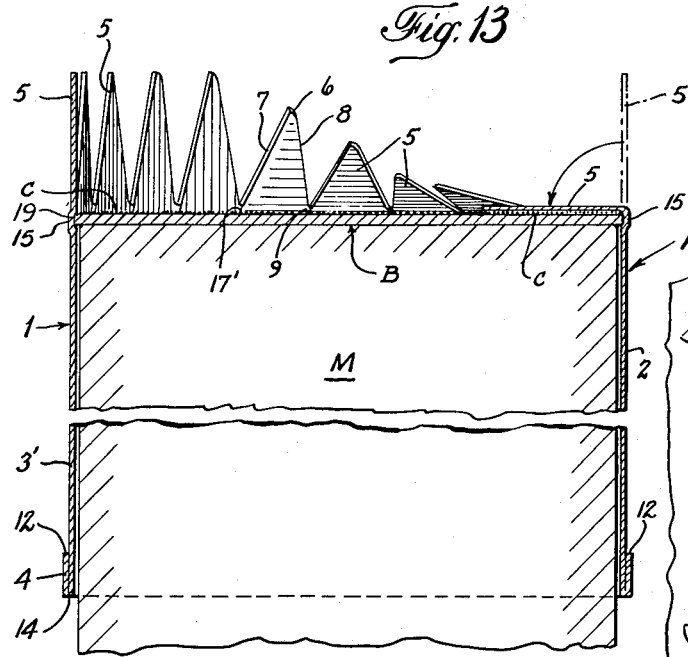
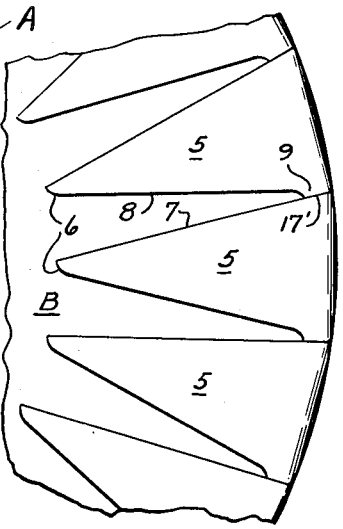
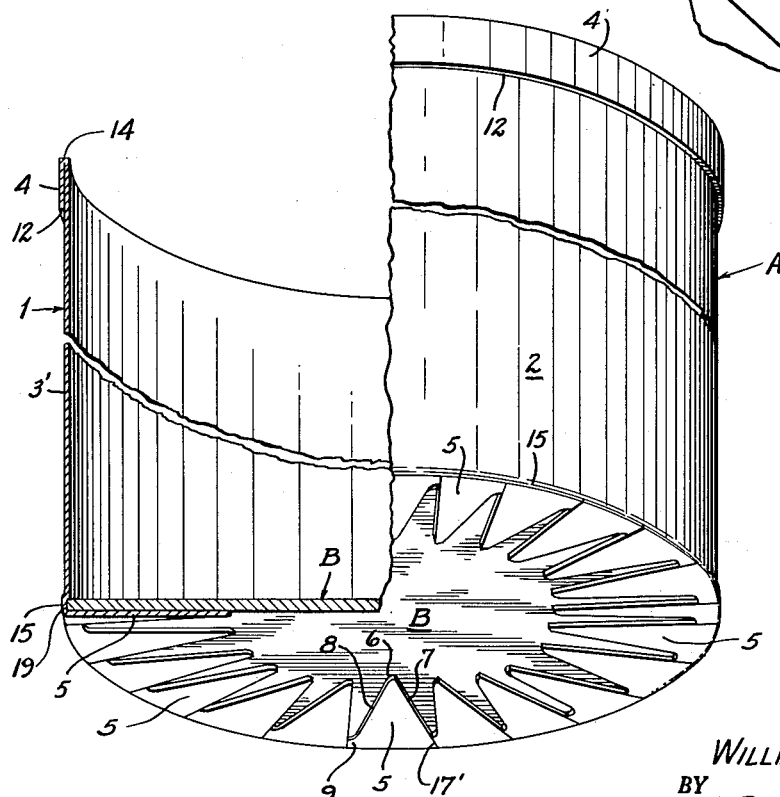

July 24, 1956 — W. A. RINGLER — 2,755,983
TUBULAR CONTAINERS
Filed March 16, 1953 — 6 Sheets-Sheet 4
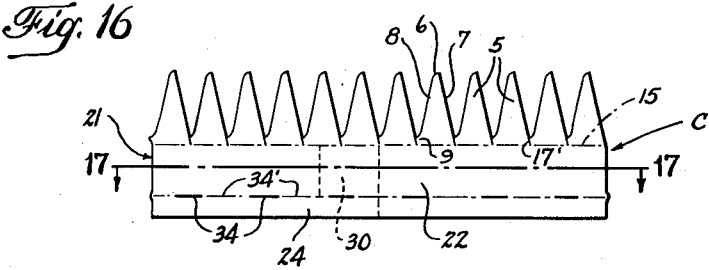
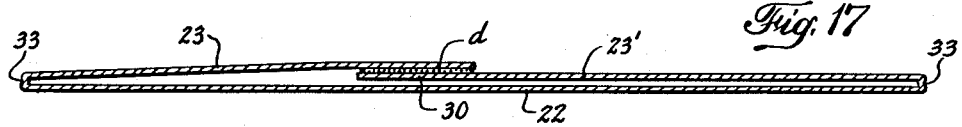
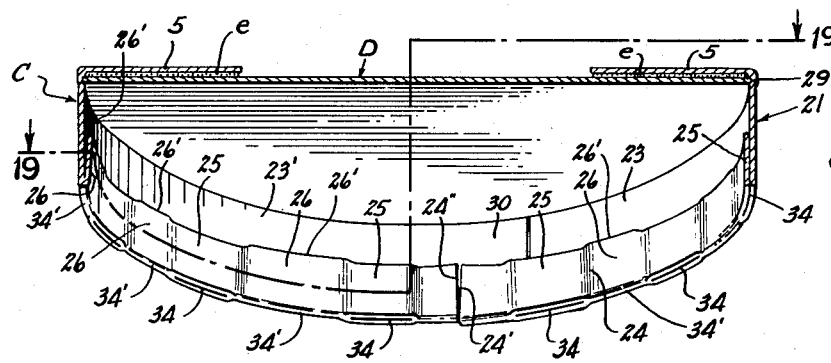
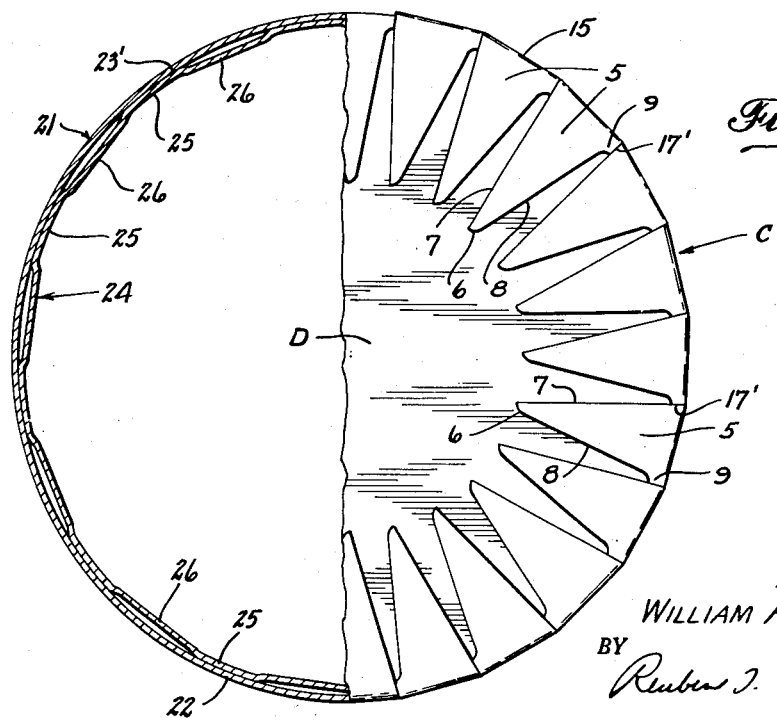
INVENTOR.
WILLIAM A. RINGLER
BY
ATTORNEY.

July 24, 1956 W. A. RINGLER 2,755,983
TUBULAR CONTAINERS
Filed March 16, 1953 6 Sheets-Sheet 5
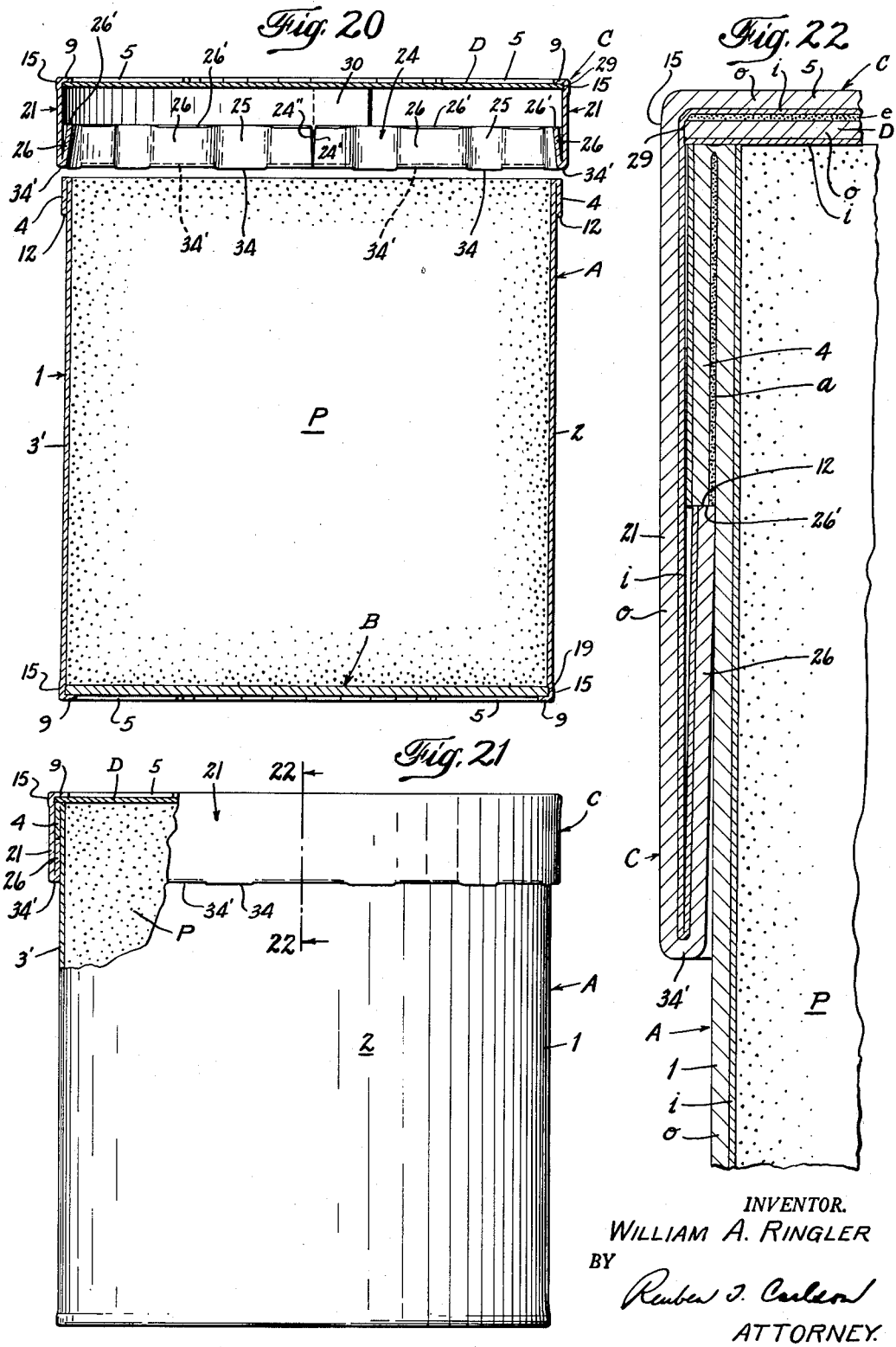
INVENTOR.
WILLIAM A. RINGLER
BY
ATTORNEY.

July 24, 1956 — W. A. RINGLER — 2,755,983
TUBULAR CONTAINERS
Filed March 16, 1953 — 6 Sheets-Sheet 6
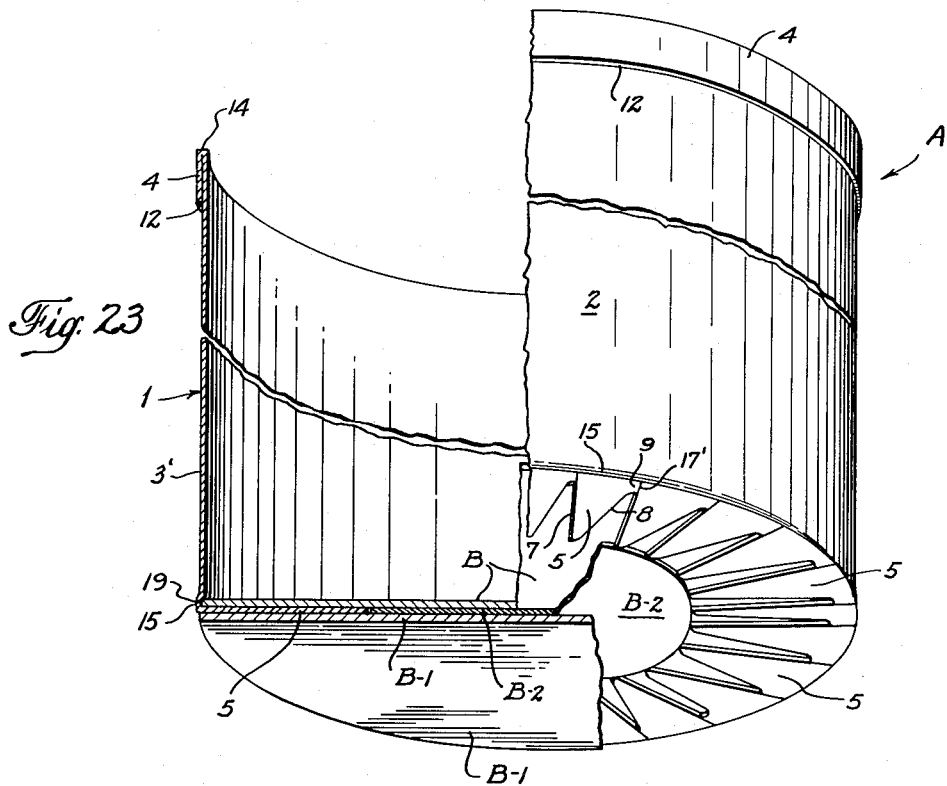
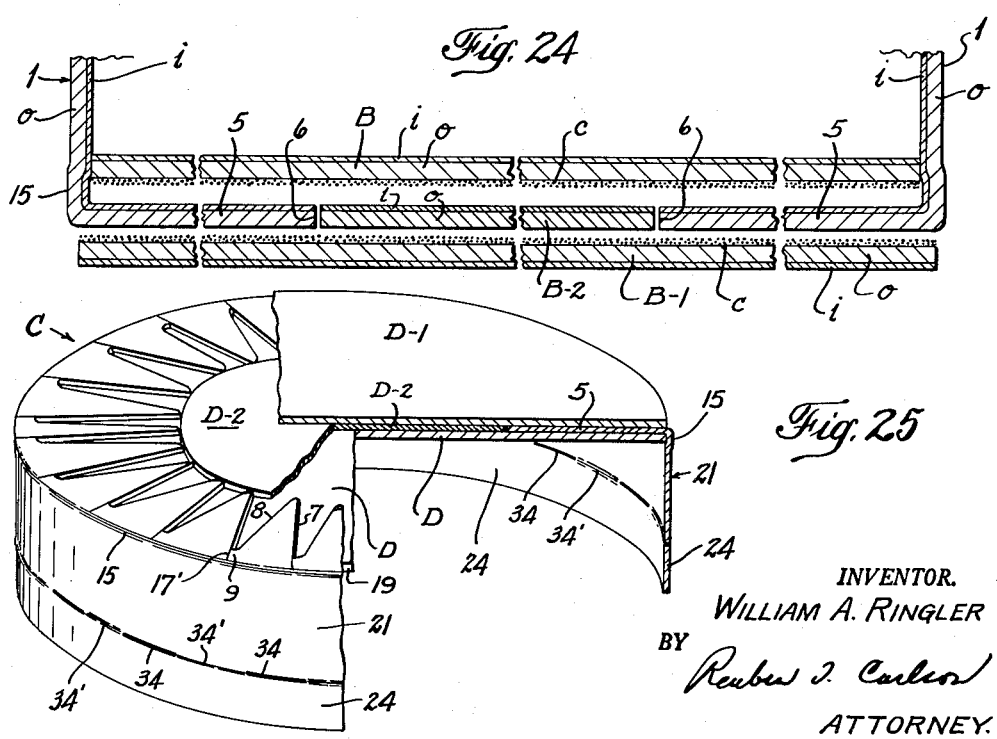
INVENTOR.
WILLIAM A. RINGLER
BY
Reuben J. Carlson
ATTORNEY.

2,755,983
Patented July 24, 1956

2,755,983
TUBULAR CONTAINERS

William A. Ringler, Wayne, Pa., assignor to The Gardner Board & Carton Co., Middletown, Ohio, a corporation of Ohio Application March 16, 1953, Serial No. 342,435

15 Claims. (Cl. 229—21)

This invention relates to tubular containers designed for the bulk packaging of various granular and semi-liquid products.

Containers used for the bulk packaging of granular and semi-liquid products should be siftproof and leakproof and possess sufficient strength to withstand the strains which the contents-filled containers can be expected to receive during shipment and handling. Tubular containers as heretofore made and used for the bulk packaging of from two to ten gallons of granular and semi-liquid products comprise an expansible container body made from paperboard or fiberboard whose bottom is formed by a closure disc held in bottom closing position by a metallic rim which is crimped or otherwise locked to the lower end of the container body. The cover closures for such tubular containers have been formed from a paperboard end closure disc seated within a metal rim shaped to telescope over the upper end of the contents-filled container body and crimped or locked thereto. To effect economy in shipping and storage costs, these tubular container bodies, along with the end closure discs and the top and bottom metal locking rims, or the metal strips from which the crimped rims are formed, are separately shipped to the products manufacturer for further fabrication or assembly into the completed containers and associated closure covers as the containers are needed for the bulk packaging of the granular or semi-liquid product.

This invention is directed to the provision of leakproof and siftproof containers for the bulk packaging of from two to ten or more gallons of granular or semi-liquid products, which are strong and sturdy in construction, and can be fabricated from paperboard or fiberboard sheet material only. Since the bottom construction and closure covers of these containers require no metal reinforcing, they can be manufactured at substantially less cost than metal rimmed containers as heretofore made and used for such purposes. The container body and bottom structure is assembled from a body blank cut from a stock sheet of selected paperboard or fiberboard material calipering in the order of thirty to forty-five thousandths of an inch in thickness and a paperboard or fiberboard bottom disc calipering in the order of sixty to one hundred thousandths of an inch in thickness. The closure cover is formed from a paperboard or fiberboard body band forming blank calipering in the order of thirty to forty-five thousands of an inch in thickness and a paperboard or fiberboard cover disc having substantially the same thickness as the body band.

The container body blanks and the cover body blanks may both be cut in pairs from rectangular paperboard or fiberboard stock sheets, previously imprinted on one side thereof only, with substantially no waste of stock sheet material. These body blanks may be fully scored and cut ready for assembly into container and cover bodies, in a single pass of the imprinted stock sheets through a cutting and scoring machine.

The prepared container body blank presents a substantially rectangular body forming section having a flange section foldably connected to the upper end thereof by a longitudinal score which provides an outturned locking rim designed to be adhesively secured to the outer face of the body section, thereby reinforcing the same and providing means for releasably locking the closure cover to the container body. The body blank is provided with a securing flap extension which may be adhesively or otherwise secured to the opposite end of the body section to provide a tubular body section. The flange section is of such length that the ends thereof will snugly abut when adhesively secured to the outside face of the body section and the blank is assembled into container body form. The container body is also preferably provided with a pair of diametrically opposed scores which extend transversely across the body section and flange section to permit flat collapse of the container body during shipment and storage.

A series of triangular shaped tongues are foldably connected to the lower end of the body section along a longitudinal score and designed to be inturned to support the bottom closure disc. Each tongue has a crotch segment adjacent the base end thereof which is separated from the adjacent tongue by a cut which extends to the tongue hinging score. The bottom forming disc is of sufficient size to be snugly contained within the container body with the peripheral edge of the disc snugly adjacent the tongue hinging score. The tongues are inturned to overlie the outside face of the bottom disc and bonded thereto by a plastic adhesive which is heat sealed to the bottom disc.

The bottom construction of this improved container is made siftproof and leakproof by the crotch segments associated with the securing tongues which become compressed and wedged between the tongues when infolded over the bottom disc, and to thereby provide a continuous inturned marginal rim around the exterior edge of the bottom disc which is further reinforced and sealed in a siftproof and leakproof manner by the plastic adhesive. Bulk containers as thus made are rugged and strong in construction, may be made to contain from two to ten or more gallons of granular or semi-liquid products, and will withstand rigorous handling during shipment and transportation without leakage or sifting of the contents through the bottom or body wall thereof.

The body blank for the closure cover comprises a body section having triangular shaped tongues foldably connected to the body section by a longitudinal score. Each tongue is provided with a crotch segment at the base end thereof which is separated from the adjacent tongue by a cut which extends down to the tongue hinging score. The body section of the band is also provided with a flange section which is foldably connected to the body section by a longitudinal fold formed by spaced score segments which are separated by intermediate cut segments. The body section has a securing flap at one end thereof designed to be adhesively or otherwise secured to the opposite end of the body section to provide the tubular band body for the cover part. The body section and flange section are traversed by a pair of diametrically opposed scores which permit flat collapse of the cover band during shipment and storage.

The closure cover may be readily assembled to the body band by applying plastic adhesive to the ouside face of the cover disc and then folding the body tongues inwardly and heat sealing the tongues to the cover closure disc. The cover disc is of such size that the perimeter thereof will snugly fit within the body band directly adjacent the tongue hinging score thereof. When the securing tongues are infolded, each crotch segment becomes pressure wedged tightly against the adjacent tongue so as to provide a substantially continuous and unbroken rim around the exterior perimeter of the cover disc, with the joint fully sealed against leakage by the plastic adhesive.

When the flange section of the cover band is inturned to overlie the inside face of the body section of the band, the flange portions extending from the segmental cuts will closely hug the inside face of the body section, while the intermediate flange portions extending from the score segments will resiliently flare away from the inside face of the body section of the band. The resiliently flaring flange portions thus provide spaced abutment edges designed to releasably interlock with the outturned flange section of the container body when the closure cover is telescoped thereover. A closure cover is thus provided which is strong and sturdy in construction, which can be economically made from paperboard or fiberboard materials only, which substantially strengthens and reinforces the upper end of the container body and becomes automatically locked to the downturned flange section of the container body when telescoped thereover.

Other objects and advantages of the invention will become apparent as the disclosure proceeds.

Although the characteristic features of this invention will be particularly pointed out in the claims, the invention itself, and the manner in which it may be carried out, may be better understood by referring to the following description taken in connection with the accompanying drawings forming a part hereof, in which Fig. 1 is an outside plan view of a one-piece fiberboard blank as cut and scored to form the container body, this view also showing in phantom lines an adjacent body forming blank to illustrate the manner in which a pair of complementary container body forming blanks may be cut from a rectangular stock sheet with substantially no resulting waste;

Fig. 2 is an outside face view of a one-piece fiberboard blank as cut and scored to form the cover band, this view also showing in phantom lines an adjacent cover band forming blank to illustrate the manner in which a pair of complementary cover band forming blanks may be cut from a rectangular stock sheet with substantially no resulting waste;

Fig. 3 is an outside face view of the fiberboard disc which is secured to the inturned tongues of the container body to provide a tight bottom for the container;

Fig. 4 is an outside face view of the fiberboard disc which is adhesively secured to the inturned tongues of the cover band to provide a locking cover for the erected container body;

Fig. 5 is an enlarged fragmentary cross section of the container body blank as viewed along the line 5—5 of Fig. 1 showing the score cut which partially severs the outwardly folding rim section from the containing wall section of the container body;

Fig. 6 is an enlarged fragmentary cross section of the container body blank as viewed along line 6—6 of Fig. 1, this view showing the score which hinges the bottom securing tongues to the container section;

Fig. 7 is an enlarged fragmentary cross section of the container body blank as viewed along line 7—7 of Fig. 1, this view showing a cross section of one of the collapsing scores which traverses the container body blank;

Fig. 8 is an enlarged fragmentary cross section of the cover band as viewed along line 8—8 of Fig. 2, this view showing a cross section of one of the spaced segment cuts which partially sever the inwardly foldable abutment flange from the cover body section;

Fig. 9 is an enlarged fragmentary cross section of the cover band as viewed along line 9—9 of Fig. 2, this view showing a cross section of one of the score segments which hinges the inwardly foldable abutment flange to the body section of the cover band;

Fig. 10 is a plan view of the container body as it appears when assembled in collapsed form from the blank shown in Fig. 1;

Fig. 11 is an enlarged fragmentary cross section of the upper portion of the collapsed container body as the same would appear when viewed along line 11—11 of Fig. 10;

Fig. 12 is a horizontal cross section of the collapsed container body as the same would appear when viewed along line 12—12 of Fig. 10;

Fig. 13 is a vertical cross section of the expanded container body as it would appear when telescoped over a forming mandrel with the body tongues in process of being folded into secured relation to the bottom forming disc;

Fig. 14 is an enlarged fragmentary plan view of the bottom end of the fully assembled container, this view showing the inturned body tongues secured to the outside face of the bottom disc;

Fig. 15 is a perspective view of the fully assembled container, certain parts thereof being broken away to illustrate further structural details;

Fig. 16 is a plan view of the cover band as assembled in collapsed form from the blank shown in Fig. 2;

Fig. 17 is a horizontal cross section of the collapsed cover band as the same would appear when viewed along line 17—17 of Fig. 16;

Fig. 18 is a fragmentary perspective view of the container cover as the same would appear after the cover end disc shown in Fig. 4 has been secured to the inturned tongues of the expanded cover band and after the locking flange associated with the cover band has been inturned to provide a locking edge;

Fig. 19 is a top plan view of the assembled cover as the same would appear when viewed along line 19—19 of Fig. 18, certain parts being broken away to illustrate structural details;

Fig. 20 is a vertical section of the container as filled with contents, this view also showing a vertical section of the container cover in position for telescoping application to the container body;

Fig. 21 is an elevational view of the filled container showing the cover applied to the container body, certain parts being broken away to illustrate structural details;

Fig. 22 is an enlarged fragmentary vertical cross section of the container cover locked to the outturned rim section of the container body;

Fig. 23 is a perspective view of a modified container part having an outer bottom disc and an intermediate filler disc bonded to the inner bottom disc and body tongues;

Fig. 24 is an enlarged fragmentary cross section of the bottom forming discs and body tongues of the container shown in Fig. 23 as the same would appear in exploded relationship; and Fig. 25 is a perspective view of a modified cover part having an outer cover disc and an intermediate filler disc bonded to the inner cover disc and body tongues.

Similar reference characters refer to similar parts throughout the several views of the drawings and specification.

The container body A is formed of selected fiberboard material which is cut and scored in the form illustrated in Fig. 1 to present parallel extending side edges 11—11' and a container section 1 traversed by a pair of scores 13 which define an intermediate half section 2 and a pair of quarter sections 3—3'. The quarter section 3' has a flap extension 10 designed to be adhesively secured to the free side edge of the quarter section 3. The upper end of the blank is traversed by a longitudinally extending score cut 14 which defines an outfolding top flange or rim section 4. The rim section 4 is traversed by a pair of scores 13' which may form continuations of the adjacent body scores 13. One end 14' of the rim section 4 is substantially in alignment with the free side edge 11 of the quarter section 3 while the other end 14' of the rim section 4 terminates short of the free side edge 11' of the securing flap extension 10 so that the ends 14'—14" of the rim section 4 may be brought substantially into abutment when the container body is assembled.

The bottom end of the container body blank is provided with a series of triangular shaped tongues by means of which the bottom forming disc B shown in Fig. 3 is secured to the containing section 1 of the container body. The securing tongues 5 are foldably connected to the bottom edge of the container body section 1 along a longitudinally extending score 15 which is impressed into the inside face of the body blank as shown in Fig. 6. Each of the securing tongues 5 presents a blunt or substantially squared end portion 6 and tapering side edges 7 and 8, with the side edge 7 extending in a straight line down to the valley score 15. The inner end of the other side edge 8 flares outwardly to define a crotch segment 9 adjacent the valley score 15 which is separated by a cut 17' from the side edge 7 of the adjacent tongue. It will be noted by referring to Fig. 1 that tongues 5 extend in side by side arrangement from the free side edge 11 continuously along the length of the bottom edge of the quarter section 3, the half section 2 and the quarter section 3' of the body blank, but that the securing extension flap 10 has no tongue projecting therefrom but presents a square cut bottom edge 10" substantially in alignment with the valley score 15.

As shown in Fig. 1, the body blanks A may be cut in pairs from a substantially rectangular stock sheet of selected fiberboard material which may first be decorated or imprinted on the outside face thereof. The stock sheet is preferably laminated as shown in Figs. 5, 6 and 9 to provide an outer layer o which may be made from unbleached fiberboard pulp having a relatively thin inner sheet i bonded to one side thereof, the inner layer i comprising a bleached sheet which provides a sanitary inner liner for the container body. Stock sheets calipering from thirty to forty-five thousandths of an inch in thickness, with a preferable thickess of thirty-five to forty thousandths of an inch, have been found to provide a container body construction of requisite strength and serviceability for the transportation of from two and one half to five gallons of contents.

The paired body blanks may be cut and scored in a continuous run of the stock sheet through a cutting and scoring machine having scoring devices and cutting knives arranged to perform the requisite cutting and scoring operations. The body blanks are preferably scored in a manner so that the grain fibers of the stock sheet will run substantially parallel with the scores 13 and perpendicular to the tongue hinging score 15.

The vertically extending scores 13 are shaped as indicated in Fig. 7 to facilitate collapse folding of the body blank and the longitudinally extending tongue hinging score 15 is shaped as indicated in Fig. 6 to facilitate infolding of the tongues 5 in a direction substantially at right angles to the containing section 1 of the blank. The score cut 14 as shown in Fig. 5 extends through the liner sheet i and for a substantial distance into the fiberboard core layer o so as to facilitate outfolding of the rim section 4 of the container body.

When a pair of complementary container body forming blanks are cut from a stock sheet as indicated in Fig. 1, the securing tongues 5 of the complementary body blanks will closely interfit with substantially no resultant waste of stock sheet material. The cutting and scoring machine is equipped with sharp cutting knives adjusted to form the tapered cuts 17 and 18 which define the tapered side edges 7 and 8 of complementary tongues, with the cutting knives which form the cuts 17 being extended to form the cut extensions 17' extending down to the tongue hinging scores 15. The cutting knives which form the cuts 18 terminate in laterally flared cutting portions which form the flared cuts 18' defining the blunted or substantially squared ends 6 of the tongues 5.

The container bodies are assembled in collapsed form by running successive body blanks through continuous high speed gluing and folding machines. In the first operation, a strip a of adhesive is applied to the outside face of the rim section 4 of the container body 1 as shown in Fig. 1. The rim section 4 is then folded along the score cut 14 into adhesively secured relation to the outside face of the body blank as shown in Figs. 10 and 11. As a result of this folding operation the folded upper edge of the rim section 4 and the container body 1 of the blank will be substantially severed and joined only by a fragment of the outer core layer o.

A strip b of adhesive is applied to the outside face of the securing flap extension 10 as shown in Fig. 1. The quarter section 3' of the blank is then folded along the adjacent score 13 to thereby place the inside face of the quarter section 3' directly adjacent the inside face of the half section 2 as shown in Figs. 10, 11 and 12. The other quarter section 3 is then folded along the adjacent score 13 so as to place the free edge portion thereof in superimposed and secured relation to the glued outside face of the securing flap extension 10. The rim section 4 will thereby also become folded along the score extensions 13' as shown in Fig. 10, with the ends 14'—14" of the rim section 4 substantially in abutment as shown in Fig. 10. The collapsible container bodies as thus formed and shown in Figs. 10 and 11 may be shipped and stored in relatively little space for assembly with the bottom discs B into containers ready to receive contents. The adhesive for strips a and b may comprise a waterproof or moisture resistant glue.

The bottom construction of the container should be at least approximately twice the thickness of the container body wall to insure adequate strength and may be formed from one or more bottom discs cut from a stock sheet having an outer core layer o containing strong and tough fiber faced by a bleached inner liner sheet i. The outer core layer o of the stock sheet is coated with a plastic heat sealing adhesive c which is applied to the stock sheet before the bottom forming discs are cut therefrom. The heat sealing adhesive is applied as a relatively heavy coating and after application becomes relatively dry will not adhere to adjacent surfaces, except when sufficient heat is applied to render the coating highly tacky and to bring out its tenacious bonding characteristics.

The bottom forming discs as cut from the stock sheet are substantially circular in shape. The inner bottom forming disc B as shown in Figs. 3 and 24 is of such size that its peripheral edge 19 will tightly seat within the expanded container body and snugly fit against the inside surface of the tongue hinging score 15 thereof. Where the container bottom is formed by the inner bottom disc B only as shown in Fig. 15, the inner disc should caliper in the order of sixty to ninety thousandths of an inch in thickness and may be formed from either a single stock sheet of such thickness or two stock sheets bonded together. Where the inner bottom forming disc B is reinforced by an outer disc B–1, as indicated in Figs. 23 and 24, the discs B and B–1 should be of substantially the same diameter and each having a thickness which approximates the thickness of the body blank A, or in the order of thirty to forty-five thousandths of an inch thickness. An intermediate disc B–2 of similar thickness may also be provided which is sandwiched between the inner and outer bottom discs B and B–1 and having a diameter to snugly seat within the boundary defined by the blunted ends 6 of the inturned body tongues 5.

Containers constructed in accordance with this invention may be rapidly assembled on an assembly machine designed for this purpose which makes use of an expansible mandrel M as diagrammatically illustrated in Fig. 3. In assembling the container, the inner bottom disc B is placed on a flat end of the mandrel, the collapsed container body A constructed as shown in Fig. 10 then expanded and telescoped over the mandrel M, and its securing tongues 5 then infolded to overlie the adhesive coating c forming a part of the inner bottom disc. Where the bottom construction is formed by an inner disc B only, a heating head is pressed against the inturned tongues 5 to render the adhesive coating c tacky and relatively plastic as the tongues are pressed into bonded relationship to the inner bottom disc B. Upon removal of the heating head, the adhesive coating c will rapidly harden and set to permanently bond the tongues to the inner disc. Where the bottom construction is to be formed as shown in Fig. 23, the intermediate disc B-2 is seated against the inner bottom disc B within the boundary formed by the blunted ends 6 of the inturned tongues, and the outer surfacing disc B-1 is then applied with its adhesive coating c adjacent the outer surface of the tongues 5 and the intermediate disc B-2. Upon application of the heating head to this bottom assembly, the intermediate disc B-2 and the inturned tongues 5 become bonded together by the adjacent adhesive coatings c upon removal of the heating head. The fully formed container can then be removed from the mandrel and filled with contents.

As shown in Figs. 13, 14, 15 and 23, the inner bottom disc B is of such size that its peripheral edge 19 snugly seats within the depressed groove defined by the tongue hinging score 15 and the crotch segments 9 of each tongue 5 are tightly wedged against the adjacent side edge of the adjacent tongue when the tongues are secured to the bottom disc. A tight and substantially leakproof bottom construction is thus provided which will hold semi-liquid and semi-frozen products without leakage. The plastic heat sealing glue c applied to the outer face of the inner bottom disc B also serves as a sealing medium which further assures a substantially leakproof container bottom. The outturned rim section 4 at the upper end of the container body strengthens and reinforces the container and in addition provides means for releasably locking the cover thereto.

The container cover is formed from a body band C secured to an inner cover disc D. As shown in Fig. 2, the body band C may be cut in complementary pairs from a substantially rectangular fiberboard stock sheet which calipers from thirty to forty-five thousandths and preferably in the order of thirty to forty thousandths of an inch in thickness. The stock sheets may be composed of an unbleached outer core layer o containing strong fiber having a bleached inner liner sheet i bonded thereto. The cover body band C may be made somewhat longer than the container body blank A so that the cover body band as formed will appropriately telescope over the rim section 4 of the assembled container body.

The cover band comprises a body section 21 traversed by a pair of double scores 33' which define a half section 22 and a pair of quarter sections 23—23' foldably connected to the half sections 22. A securing flap extension 30 projects from the outer end of the quarter section 23'. An inwardly foldable abutment flange 24, traversed by a pair of score extensions 33' which are substantially in alignment with the body scores 33, is connected to the half section 22 and quarter sections 23—23' by a longitudinally extending fold as shown in Figs. 4, 8 and 9. This fold comprises spaced segmental cuts 34 which extend substantially through the cover blank and are joined by alternating score segments 34' pressed into the inner face of the cover blank. The longitudinal fold as thus formed by the spaced segmental cuts 34 and the intervening double score segments 34' permit inward folding of the abutment flange 24 when the cover band is assembled as shown in Figs. 18 and 19.

A series of triangular shaped tongues 5 are foldably connected to the band half sections 22 and the quarter half sections 23—23' along a longitudinally extending score 15 which is pressed into the inside face of the cover band. The securing tongues 5 associated with the cover band may be formed similar to the securing tongues 5 associated with the container body blank A with each tongue 5 of the cover band presenting a substantially squared end portion 6 and tapered side edges 7 and 8, with the side edge 7 extending in a straight line down to the longitudinal score 15. The inner end of each side edge 8 flares outwardly to define a crotch segment 9 adjacent the valley score 15 which is separated by a cut 17' from the side edge 7 of the adjacent tongue. The securing tongues 5 extend along the full length of the half section 22 and quarter sections 23—23' of the cover blank, but the securing flap extension 30 has no tongue associated therewith but terminates in a square cut longitudinal edge 30' extending substantially in alignment with the tongue hinging score 15. The opposite longitudinal edge 30" is substantially in alignment with the fold formed by the segmental cuts 34 and intervening score segments 34". The abutment flange 24 is also of such length that its ends 24' and 24" will substantially abut when the abutment flange is infolded within the assembled cover band.

In assembling the cover body band, waterproof adhesive b is applied to the outside face of its securing flap extension 30 and the quarter section 23' and its associated abutment flange segment is then folded along adjacent score 33 into overlying relation to the inside face of the half section 22 and the adjacent abutment flange section. The quarter section 23 and its associated abutment flange section is then folded along the adjacent double score 33 so as to place the free end of the quarter section 23 into adhesively secured relation to the securing flap extension 30, thereby completing the assembly of the cover band in collapsed form as shown in Figs. 16 and 17.

The end wall of the closure cover may be formed by a single cover disc D cut from a fibreboard stock sheet having an outer core layer o to which a bleached inner facing sheet i is bonded. This stock sheet may be approximately the same thickness as that used to form the cover body band, and has a relatively heavy coating of plastic heat sealing adhesive c applied to the core layer o thereof. The cover disc D is of such size that when inserted within the assembled body band, the peripheral edge 29 of the disc will snugly seat within the internal groove formed by the tongue hinging score 15 as shown in Figs. 18 and 20.

The closure cover may be assembled by expanding the collapsed body band C and telescoping the same over a suitable mandrel which has the closure disc D seated on the end thereof, with the adhesive coating c thereof facing outwardly. The tongues 5 associated with the cover band are then infolded to overlie the adhesive coating c forming a part of the closure disc D. A heated sealing head is then pressed against the inturned tongues 5 to render the adhesive coating c tacky and to bond the tongues to the inner cover disc D. When the tongues 5 are infolded into adhesively secured relation to the closure disc D, the crotch segments 9 thereof become tightly wedged against the adjacent side edge of adjacent tongues to provide a substantially tight and leakproof cover construction.

While a single closure disc D having a thickness approximately equal to the thickness of the cover band will provide, when heat sealed to the tongues 5 and their associated crotch segments 9, a substantially leakproof construction, the cover may if desired be further reinforced and its appearance enhanced by adding an outer cover closure disc D-1 and an intermediate disc D-2 which are heat sealed to the inner cover disc D and inturned tongues 5 as shown in Fig. 25. The outer cover disc D-1 and intermediate disc D-2 may be cut from a stock sheet having the same thickness and plastic heat sealing adhesive coating c composition as is used to form the inner cover disc D.

In assembling the discs D, D-2 and D-1 to the expanded cover band, the tongues 5 are inturned to overlie the adhesive coating c of the inner closure disc D as snugly fitted within the expanded body band, the intermediate disc D-2 then positioned within the perimeter defined by the blunted ends 6 of the inturned body tongues 5, and the outer disc D-1 then positioned thereover so that the adhesive coating c thereof is in contact with the outer face of the inturned tongues 5 and the intermediate disc D–2. The heated sealing head is then tightly pressed against the outer face of the outer disc D–1 so as to render the thermal plastic adhesive coatings c tacky, with sufficient pressure applied to the heated sealing head to firmly bond the tongues 5 to the inner and outer closure discs D and D–1. Upon removal of the heated sealing head, the tacky adhesive will rapidly solidify and provide a permanent bond.

When the container cover is removed from the forming mandrel, its abutment flange 24 will extend substantially in alignment with the body section 21 of the closure cover as shown in Fig. 25. The abutment flange 24 can then be folded inwardly to overlie the inside face of the body band wall 21 as shown in Figs. 18 and 19. When the abutment flange 24 is thus infolded, the flange portions 25 thereof extend inwardly from the cut segments 34 and will have a tendency to closely hug the inside face of the body band section 21 as indicated in Figs. 18 and 19, while the intermediate flange portions 25' which remain hinged to the body band along the double score segments 34' will resiliently flare inwardly and away from the inside face of the body band wall 21. As a result, the free edges 26' of the spaced intermediate portions 25' of the inturned abutment flange provide resilient abutment edges 26' designed to releasably engage the abutment edge 12 of the outturned rim section 4 of the container body and interlock therewith when the cover is telescoped over the contents-filled container body in the manner shown in Figs. 20, 21 and 22.

The container bodies A and the cover bodies C may be assembled in the collapsed forms indicated in Figs. 10 and 16 at the container plant and thus stacked to occupy minimum space for shipment to the product packing plant along with a complementary number of flat bottom closure discs and cover closure discs. The container bodies and bottom closure discs can be readily assembled on a jig or assembly machine at the products plant and the container parts as shown in Figs. 15 and 23 can then be filled with the desired granular, powdered or semi-liquid product as shown in Fig. 20. The cover parts, similarly assembled from the cover bodies and the cover closure discs, can then be telescoped over the rim section 4 of the filled container parts so that the spaced abutment edges 26' of the flared intermediate portions 25' will automatically spring into abutting and locking engagement with the abutment edge 12 of the rim section 4.

Container assemblies constructed in accordance with this invention can be advantageously used for the packaging of semi-frozen creams and fruit juices for subsequent hard freezing of the container contents in a freezing chamber. Bulk containers for ice cream and fruit ices having a containing capacity of two and one half to five gallons may be made in accordance with this invention from container body blanks A, cover body blanks C and cover closure discs D cut from stock sheets of paperboard or fiberboard material containing a requisite amount of a strong fiber for strength, and calipering from thirty to forty thousandths of an inch in thickness, and bottom closure discs B cut from paperboard or fiberboard stock sheets calipering in the order of sixty to eighty thousandths of an inch in thickness provide a relatively stiff bottom member. If desired, the bottom construction may be made from a pair of inner and outer closure discs B and B–1 and an intermediate disc B–2 which are adhesively secured together to provide a bottom closure member of approximately two to three times the thickness of the body wall.

Such containers having diameters in the order of eight to ten inches, with an average diameter of approximately nine inches, may be provided with end closure tongues 5 having an overall length, as measured from the adjacent tongue hinging score 15, of approximately two and one half inches, and a base width of approximately one inch to one and a quarter inch, or a mean average of approximately one and one eighth inch. The crotch segments 9 associated with each tongue would thus be in the approximate order of one fourth inch in length as measured from the adjacent tongue hinging score 15. Where tongues of such dimensional characteristics are associated with container bodies and cover bodies having a diameter of approximately nine inches, approximately twenty-four such tongues would be required.

Upon infolding of the tongues 5 into adhesive relation to the adjacent closure disc, the line cuts 17' which separate the side edge of each segment from the adjacent side edge 7 of the adjacent tongue become closed, and the side edge of the crotch segment becomes pressure wedged against the adjacent side edge of the adjacent tongue into tight fitting relationship so as to provide a substantially continuous and unbroken rim extending inwardly over the outside face of the adjacent closure disc for a distance of approximately three sixteenths to five sixteenths of an inch or a mean average of approximately one fourth inch. The base end of each tongue and its associated crotch sgement would then be compressed between adjacent tongues and its overall width reduced approximately one sixteenth of an inch. A substantially continuous and unbroken inturned closure supporting rim is thus produced which is sealed to the peripheral edge of the closure disc and rendered leakproof and siftproof by the cementing action of the plastic heat sealing adhesive applied as a relatively heavy coating to the outer face of the closure disc.

Where the bottom construction is formed by the use of an outer closure disc B–1 in association with the inner closure disc D, the base portions and associated crotch segments of the inturned tongues are sealed together on both sides thereof by the plastic heat sealing adhesive c applied to the adjacent surfaces of these discs, thereby further insuring a siftproof and leakproof bottom construction. While the intermediate bottom disc D–2 may be used to provide a stiffening filler between the inner and outer bottom discs B and B–1, the intermediate disc B–2 may be eliminated if desired.

A single cover closure disc D which approximates the thickness of the body band provides a leakproof and siftproof cover construction of adequate strength in most cases. However, a cover construction of greater strength may be formed by the use of inner and outer cover discs D and D–1, with or without an intermediate filler disc D–2, in which case the inturned rim portion as formed by the base portions and crotch segments of the inturned tongues are sealed together by the adhesive coating c on both sides thereof.

Container assemblies constructed in accordance with this invention and containing from two to ten gallons of contents will withstand rough handling without leakage of contents, and will adequately meet the most rigid requirements of shipment and transportation. Since the entire container assembly is made from fibrous sheet stock and selected adhesive, these container assemblies may be manufactured, assembled and packed with contents at substantial savings in overall packaging costs, as compared with metal rimmed containers heretofore used for the bulk packaging of comparable quantities of granular, powdered and semi-liquid products.

While certain novel features of this invention have been disclosed herein and are pointed out in the claims, it will be understood that various omissions, substitutions and changes may be made by those skilled in the art without departing from the spirit of the invention.

What is claimed is:

1. A closure cover for a tubular container body which includes, a body member formed from a single blank of fibrous sheet material presenting a tubular body section, a securing flap extension projecting from a side edge of the body section and secured to the inside face of the opposite side edge of said body section, an inturned flange section overlying the inside face of said body section with the ends of said flange section substantially in abutment, said flange section presenting a series of spaced inwardly flaring flange portions foldably jointed to the lower edge of said body section by correspondingly spaced score segments and intermediate flange portions substantially severed from the lower edge of said body section by correspondingly spaced segmental cuts to thereby permit said intermediate flange portions to hug the inside face of the body section, and a series of substantially triangular shape tongues extending inwardly from said body section, a cover closure disc formed from fibrous sheet material snugly fitted within said body section and seating against said inturned tongues, said tongues having crotch segments integral therewith and projecting laterally therefrom adjacent the base ends thereof, said crotch segments having the side edges thereof pressure wedged against the adjacent side edges of adjacent tongues, and a plastic heat sealing adhesive bonding said tongues to said closure disc, said crotch segments and the associated base portions of said tongues being sealed and joined together by said adhesive to provide a substantially unbroken and continuous inwardly extending rim sealed to the peripheral edge portion of said closure disc.

2. A one-piece tubular body forming blank made from fibrous sheet material having a substantially rectangular body section, and a series of similar and generally triangular shaped tongues foldably joined to one end of the body section along a longitudinally extending score, each of said tongues having a blunted apex and a substantially straight side edge extending to said longitudinal score and inclined at an acute angle thereto and a crotch segment flaring laterally from the opposite side of the tongue adjacent said longitudinal score, the side edge of each crotch segment extending to said longitudinal score and substantially in parallelism with the opposite straight side edge of the tongue and substantially in abutment against the adjacent straight side edges of the adjacent tongue, each of said crotch segments presenting an outer edge contoured in reverse conformity to the edge contour of the blunted apex of said tongues.

3. A one-piece tubular body forming blank made from fibrous sheet material having a substantially rectangular body section, a series of similar and generally triangular shaped tongues foldably joined to one end of the body section along a longitudinally extending score, each of said tongues having a blunted apex and a substantially straight side edge extending to said longitudinal score and inclined at an acute angle thereto and a crotch segment flaring laterally from the opposite side of the tongue adjacent said longitudinal score, the side edge of each crotch segment extending to said longitudinal score and substantially in parallelism to the opposite straight side edge of the tongue and separated from the straight side edge of the adjacent tongue by a line cut only, each of said crotch segments presenting an outer edge contoured in reverse conformity to the edge contour of the blunted apex of said tongues, a flange section foldably joined to the opposite end of said body section along a longitudinal fold which is substantially parallel to said longitudinal score, a securing flap extension projecting from a side edge of said body section whose end edges are substantially in alignment with said longitudinal score and said longitudinal fold respectively, and a pair of substantially parallel body collapsing scores extending transversely of the body section and flange section of the blank and spaced apart a distance substantially equal to one-half the length of the body section.

4. A one-piece tubular body forming blank made from fibrous sheet material having a substantially rectangular body section, a series of similar and generally triangular shaped tongues foldably joined to one end of the body section along a longitudinally extending score, each of said tongues having a blunted apex and a substantially straight side edge extending to said longitudinal score and inclined at an acute angle thereto and a crotch segment flaring laterally from the opposite side of the tongue adjacent said longitudinal score, the side edge of said crotch segment extending to said longitudinal score and substantially in parallelism to the opposite straight side edge of the tongue and separated from the straight side edge of the adjacent tongue by a line cut only, each of said crotch segments presenting an outer edge contoured in reverse conformity to the edge contour of the blunted apex of said tongues, and an outfolding flange section joined to the opposite end of said body section along a longitudinal score cut which is substantially parallel to said longitudinal score, said longitudinal score cut severing the blank fibers on the inside face of the blank to a depth of approximately one half the thickness of the blank with the uncut fibers foldably connecting the flange section to the body section.

5. A one-piece tubular body forming blank made from fibrous sheet material having a substantially rectangular body section, a series of similar and generally triangular shaped tongues foldably joined to one end of the body section along a longitudinally extending score, each of said tongues having a blunted apex and a substantially straight side edge extending to said longitudinal score and inclined at an acute angle thereto and a crotch segment flaring laterally from the opposite side of the tongue adjacent said longitudinal score, the side edge of said crotch segment extending to said longitudinal score and substantially in parallelism to the opposite straight side edge of the tongue and separated from the straight side edge of the adjacent tongue by a line cut only, each of said crotch segments presenting an outer edge contoured in reverse conformity to the edge contour of the blunted apex of said tongues, an outfolding flange section joined to the opposite end of said body section along a longitudinal score cut which is substantially parallel to said longitudinal score, said longitudinal score cut severing the blank fibers on the inside face of the blank to a depth of approximately one half the thickness of the blank with the uncut fibers foldably connecting the flange section to the body section, a securing flap extension projecting from a side edge of said body section whose end edges are substantially in alignment with said longitudinal score and said longitudinal score cut respectively, and a pair of substantially parallel body collapsing scores extending transversely of the body section and flange section of the blank and spaced apart a distance substantially equal to one half the length of the body section.

6. A one-piece tubular body forming blank made from fibrous sheet material having a substantially rectangular body section, a series of similar and generally triangular shaped tongues foldably joined to one end of the body section along a longitudinally extending score, each of said tongues having a blunted apex and a substantially straight side edge extending to said longitudinal score and inclined at an acute angle thereto and a crotch segment flaring laterally from the opposite side of the tongue adjacent said longitudinal score, the side edge of said crotch segment extending to said longitudinal score and substantially in parallelism to the opposite straight side edge of the tongue and separated from the straight side edge of the adjacent tongue by a line cut only, each of said crotch segments presenting an outer edge contoured in reverse conformity to the edge contour of the blunted apex of said tongues, and an infolding flange section joined to the opposite end of said body section along a longitudinal fold which is substantially parallel to said longitudinal score, said longitudinal fold being defined by spaced segmental cuts substantially severing the adjacent portions of the flange section from the body section and intermediate score segments foldably connecting the flange section to the body section.

7. A one-piece tubular body forming blank made from fibrous sheet material having a substantially rectangular body section, a series of similar and generally triangular shaped tongues foldably joined to one end of the body section along a longitudinally extending score, each of said tongues having a blunted apex and a substantially straight side edge extending to said longitudinal score and inclined at an acute angle thereto and a crotch segment flaring laterally from the opposite side of the tongue adjacent said longitudinal score, the side edge of said crotch segment extending to said longitudinal score and substantially in parallelism to the opposite side edge of the tongue and separated from the straight side edge of the adjacent tongue by a line cut only, each of said crotch segments presenting an outer edge contoured in reverse conformity to the edge contour of the blunted apex of said tongues, an infolding flange section joined to the opposite end of said body section along a longitudinal fold which is substantially parallel to said longitudinal score, said longitudinal fold being defined by spaced segmental cuts substantially severing the adjacent portions of the flange section from the body section and intermediate score segments foldably connecting the flange section to the body section, a securing flap extension projecting from a side edge of said body section whose end edges are substantially in alignment with said longitudinal score and said longitudinal fold respectively, and a pair of substantially parallel body collapsing scores extending transversely of the body section and flange section of the blank and spaced apart a distance substantially equal one half the length of the body section.

8. A pair of complementary tubular body forming blanks cut from a substantially rectangular fibrous stock sheet, each of said blanks having a substantially rectangular body section and a series of similar and generally triangular shaped tongues foldably joined to one end of the body section along a longitudinally extending score, each of said tongues having a blunted apex and a substantially straight side edge extending to said longitudinal score and inclined at an acute angle thereto and a crotch segment flaring laterally from the opposite side edge of the tongue adjacent said longitudinal score, the side edge of said crotch segment extending to said longitudinal score and substantially in parallelism to the opposite straight side edge of the tongue and substantially in abutment against the adjacent straight side edge of the adjacent tongue, each of said crotch segments presenting an outer edge contoured in reverse conformity to the edge contour of the blunted apex of said tongues, the series of tongues associated with one of said blanks being shaped to snugly intermesh with the series of tongues associated with the complementary blank and with adjacent intermeshing tongues separated from each other by line cuts only.

9. A pair of complementary tubular body forming blanks cut from a substantially rectangular fibrous stock sheet, each of said blanks having a substantially rectangular body section and a series of similar and generally triangular shaped tongues foldably joined to one end of the body section along a longitudinal extending score, each of said tongues having a blunted apex and a substantially straight side edge extending to said longitudinal score and inclined at an acute angle thereto and a crotch segment flaring laterally from the opposite side edge of the tongue adjacent said longitudinal score, the side edge of said crotch segment extending to said longitudinal score and substantially in parallelism to the opposite straight side edge of the tongue and substantially in abutment against the adjacent straight side edge of the adjacent tongue, each of said crotch segments presenting an outer edge contoured in reverse conformity to the edge contour of the blunted apex of said tongues, and a flange section foldably joined to the opposite end of said body section along a longitudinal fold which is substantially parallel to said longitudinal score, the series of tongues associated with one of said blanks being shaped to snugly intermesh with the series of tongues associated with the complementary blank and with adjacent intermeshing tongues separated from each other by line cuts only.

10. A pair of complementary tubular body forming blanks cut from a substantially rectangular fibrous stock sheet, each of said blanks having a substantially rectangular body section and a series of similar and generally triangular shaped tongues foldably joined to one end of the body section along a longitudinal extending score, each of said tongues having a blunted apex and a substantially straight side edge extending to said longitudinal score and inclined at an acute angle thereto and a crotch segment flaring laterally from the opposite side edge of the tongue adjacent said longitudinal score, the side edge of said crotch segment extending to said longitudinal score and substantially in parallelism to the opposite straight side edge of the tongue and separated from the straight side edge of the adjacent tongue by a line cut only, each of said crotch segments presenting an outer edge contoured in reverse conformity to the edge contour of the blunted apex of said tongues, a flange section foldably joined to the opposite end of said body section along a longitudinal fold which is substantially parallel to said longitudinal score, and a securing flap extension projecting from the side edge of each body section whose end edges are substantially in alignment with said longitudinal score and said longitudinal fold respectively, the series of tongues associated with one of said blanks being shaped to snugly intermesh with the series of tongues associated with the complementary blank and with adjacent intermeshing tongues separated from each other by line cuts only.

11. A container assembly designed for the bulk packaging of granular, powdered and semi-liquid products which includes, a containing part presenting a body member formed from a single blank of fibrous sheet material presenting a tubular body section, an outturned rim section foldably joined to the upper edge of said body section and adhesively bonded to the outside face thereof with the ends of said rim section substantially in abutment, a series of substantially triangular shaped tongues extending inwardly from said body section, and a bottom closure disc formed from fibrous sheet material snugly seated within said body section and secured to said inturned tongues, a cover part presenting a tubular body section designed to telescope over the outturned rim section of said containing body member, an inturned flange section overlying the inside face of said cover body section with the ends of said flange section substantially in abutment, said flange section presenting a series of spaced inwardly flaring flange portions foldably joined to the lower edge of said cover body section by correspondingly spaced score segments and intermediate flange portions substantially severed from the lower edge of said cover body section by correspondingly spaced segmental cuts to thereby cause said intermediate flange portions to hug the inside face of the cover body section and present the free edges of said inwardly flaring flange portions in position to releasably abut the free edge of the rim section of the container body, said cover body section having substantially triangular shaped tongues extending inwardly from said body section, and a cover closure disc formed from fibrous sheet material snugly fitted within said cover body section and secured to said inturned tongues.

12. A container assembly designed for the bulk packaging of granular, powdered and semi-liquid products which includes, a containing part presenting a body member formed from a single blank of fibrous sheet material presenting a tubular body section, an outturned rim section foldably joined to the upper edge of said body section and adhesively bonded to the outside face thereof with the ends of said rim section substantially in abutment, a series of substantially triangular shaped tongues extending inwardly from said body section, and a bottom closure disc formed from fibrous sheet material snugly seated within said body section and seating against said inturned tongues, a cover part presenting a tubular body section designed to telescope over the outturned rim section of said containing body member, an inturned flange section overlying the inside face of said cover body section with the ends of said flange section substantially in abutment, said flange section presenting a series of spaced inwardly flaring flange portions foldably joined to the lower edge of said cover body section by correspondingly spaced score segments and intermediate flange portions substantially severed from the lower edge of said cover body section by correspondingly spaced segmental cuts to thereby cause said intermediate flange portions to hug the inside face of the body section and present the free edges of said inwardly flaring flange portions in position to releasably abut the free edge of the rim section of the container body, said cover body section having substantially triangular shaped tongues extending inwardly from said body section, and a cover closure disc formed from fibrous sheet material snugly fitted within said cover body section and seated against said inturned tongue, the tongues associated with the container body and cover body having crotch segments integral therewith and projecting laterally therefrom adjacent the base ends thereof, said crotch segments having the side edges thereof pressure wedged against the adjacent side edges of adjacent tongues, and a plastic heat sealing adhesive bonding said tongues to the adjacent closure disc, said crotch segments and the associated base portions of said tongues being sealed and joined together by said adhesive to provide a substantially unbroken and continuous inwardly extending rim at each end of the container assembly sealed to the peripheral edge portion of the adjacent closure disc.

13. A body member formed from a single blank of fibrous sheet material presenting a tubular body section, an inturned flange section overlying the inside face of said body section with the ends of said flange section substantially in abutment, said flange section presenting a series of spaced inwardly flaring flange portions foldably joined to an end edge of said body section by correspondingly spaced score segments and intermediate flange portions substantially severed from said end edge of the body section by correspondingly spaced segmental cuts to thereby permit said intermediate flange portions to hug the inside face of the body section.

14. A body member formed from a single blank of fibrous sheet material presenting a tubular body section, a securing flap extension projecting from a side edge of the body section and secured to the opposite side edge of said body section, an inturned flange section overlying the inside face of said body section with the ends of said flange section substantially in abutment, said flange section presenting a series of spaced inwardly flaring flange portions foldably joined to an end edge of said body section by correspondingly spaced score segments and intermediate flange portions substantially severed from said end edge of the body section by correspondingly spaced segmental cuts to thereby permit said intermediate flange portions to hug the inside face of the body section.

15. A closure cover for a tubular container body which includes, a body member formed from a single blank of fibrous sheet material presenting a tubular body section, a securing flap extension projecting from a side edge of the body section and secured to the inside face of the opposite side edge of said body section, an inturned flange section overlying the inside face of said body section with the ends of said flange section substantially in abutment, said flange section presenting a series of spaced inwardly flaring flange portions foldably joined to one end edge of said body section by correspondingly spaced score segments and intermediate flange portions substantially severed from said end edge of the body section by correspondingly spaced segmental cuts to thereby permit said intermediate flange portions to hug the inside face of the body section, a closure disc formed from fibrous sheet material snugly fitted within said body section and means associated with said body section at the other end thereof for supporting said closure disc.

References Cited in the file of this patent

UNITED STATES PATENTS

| | | |
|---|---|---|
| 47,069 | Millet | Mar. 28, 1865 |
| 1,673,109 | Fenstermacher | June 12, 1928 |
| 2,014,477 | Lee | Sept. 17, 1935 |
| 2,089,084 | Arneson | Aug. 3, 1937 |
| 2,115,745 | Page | May 3, 1938 |
| 2,350,232 | Hines | May 30, 1944 |
| 2,389,547 | Ringler | Nov. 20, 1945 |
| 2,530,787 | Sanford | Nov. 21, 1950 |

FOREIGN PATENTS

| | | |
|---|---|---|
| 5,777 | Great Britain | Aug. 3, 1911 |